(12) United States Patent
Zhou

(10) Patent No.: US 10,904,508 B2
(45) Date of Patent: Jan. 26, 2021

(54) 360 DEGREE VIDEO WITH COMBINED PROJECTION FORMAT

(71) Applicant: Avago Technologies General IP (Singapore) Pte. Ltd., Singapore (SG)

(72) Inventor: Minhua Zhou, San Diego, CA (US)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 36 days.

(21) Appl. No.: 15/920,332

(22) Filed: Mar. 13, 2018

(65) Prior Publication Data

US 2018/0270468 A1 Sep. 20, 2018

Related U.S. Application Data

(60) Provisional application No. 62/471,895, filed on Mar. 15, 2017.

(51) Int. Cl.
*H04N 13/139* (2018.01)
*H04N 5/232* (2006.01)
*H04N 19/597* (2014.01)
*H04N 13/161* (2018.01)

(52) U.S. Cl.
CPC ....... *H04N 13/139* (2018.05); *H04N 5/23238* (2013.01); *H04N 13/161* (2018.05); *H04N 19/597* (2014.11)

(58) Field of Classification Search
CPC .. H04N 13/139; H04N 13/161; H04N 19/597; H04N 5/23238
See application file for complete search history.

(56) References Cited

U.S. PATENT DOCUMENTS

| | | | |
|---|---|---|---|
| 9,721,393 B1* | 8/2017 | Dunn | G06T 19/006 |
| 2002/0126129 A1* | 9/2002 | Snyder | G06T 3/0031 345/582 |
| 2009/0041379 A1* | 2/2009 | Shih | G06K 9/32 382/276 |
| 2017/0347084 A1* | 11/2017 | Boyce | H04N 19/30 |
| 2018/0077210 A1* | 3/2018 | Hannuksela | H04L 65/4076 |
| 2018/0184121 A1* | 6/2018 | Kim | H04N 19/597 |
| 2018/0249163 A1* | 8/2018 | Curcio | H04N 19/167 |

* cited by examiner

*Primary Examiner* — Neil R Mikeska
(74) *Attorney, Agent, or Firm* — Morgan, Lewis & Bockius LLP

(57) ABSTRACT

In a system for 360 degree video capture and playback, 360 degree video may be captured, stitched, encoded, decoded, rendered, and played-back. A device for video coding with adaptive projection format may include at least one processor configured to combine at least two different projection formats into a combined projection format and encode a video stream using the combined projection format. The at least one processor may be further configured to decode a video stream that is encoded with a combined projection formation that includes at least two different projection formats.

23 Claims, 9 Drawing Sheets

# 360 DEGREE VIDEO WITH COMBINED PROJECTION FORMAT

CROSS-REFERENCE TO RELATED APPLICATIONS

The present application claims the benefit of priority under 35 U.S.C. § 119 from U.S. Provisional Patent Application Ser. No. 62/471,895 entitled "360 DEGREE VIDEO WITH COMBINED PROJECTION FORMAT," filed on Mar. 15, 2017, the disclosure of which is hereby incorporated by reference in its entirety for all purposes.

TECHNICAL FIELD

The present disclosure relates to video capture and playback, and more particularly to 360 degree video with combined projection format.

BACKGROUND 360 degree video, also known as 360 degree videos, immersive videos, and/or spherical videos, are video recordings of a real-world panorama, where the view in every direction is recorded at the same time, shot using an omnidirectional camera or a collection of cameras. During playback, the viewer has control of field of view (FOV) angles and viewing directions (a form of virtual reality).

BRIEF DESCRIPTION OF THE DRAWINGS

Certain features of the subject technology are set forth in the appended claims. However, for purpose of explanation, one or more implementations of the subject technology are set forth in the following figures.

Figure 1:
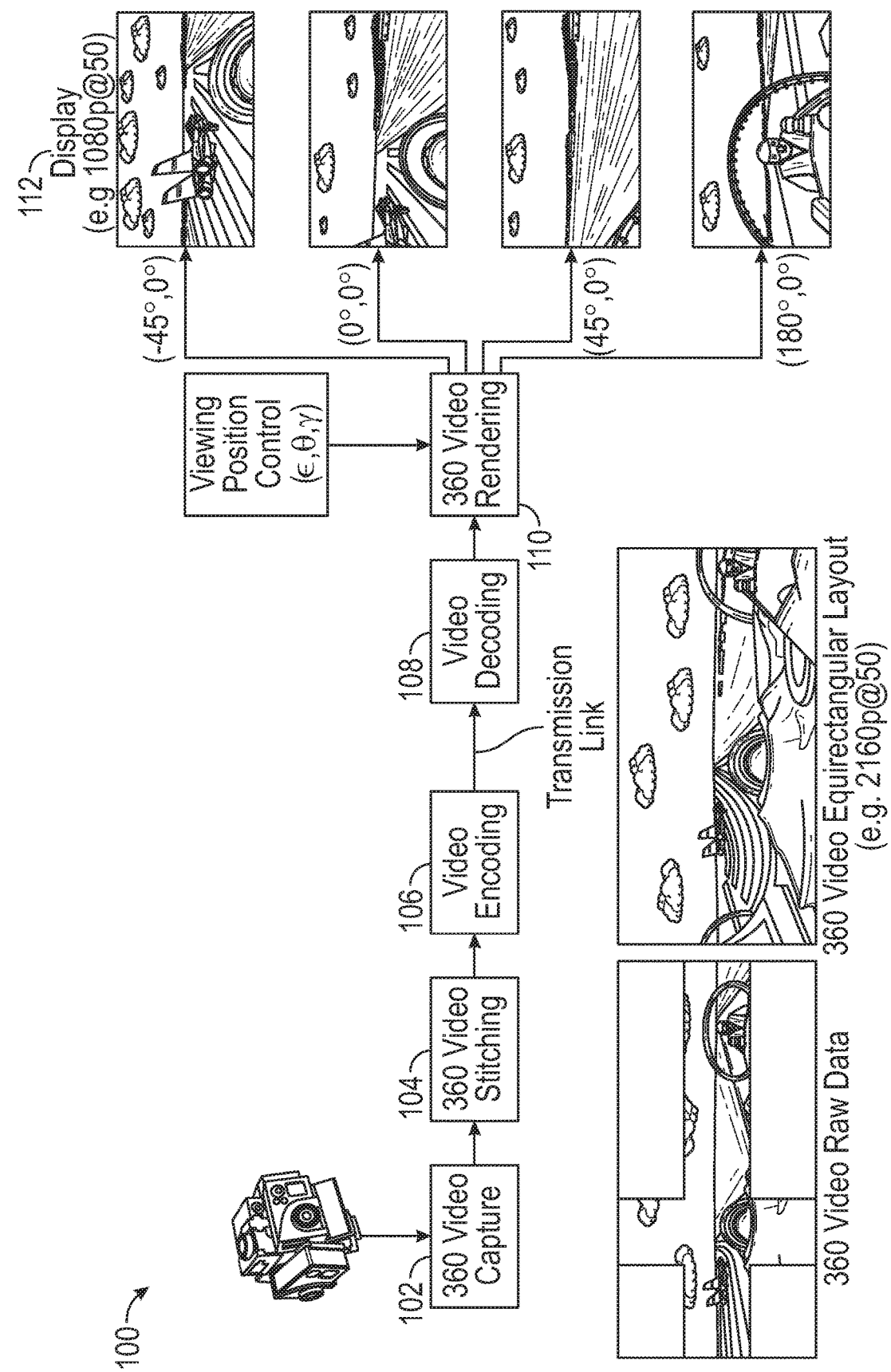
FIG. 1 illustrates an example network environment in which 360 degree video capture and playback may be implemented in accordance with one or more implementations of the subject technology.

The accompanying appendix, which is included to provide further understanding of the subject technology and are incorporated in and constitute a part of this specification, illustrate aspects of the subject technology and together with the description serve to explain the principles of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In a system for 360 degree video capture and playback, 360 degree video may be captured, stitched, encoded, decoded, rendered, and played-back. In one or more implementations, a device for video coding with adaptive projection format may include at least one processor configured to combine at least two different projection formats into a combined projection format and encode a video stream using the combined projection format. The at least one processor may be further configured to decode a video stream that is encoded with a combined projection formation that includes at least two different projection formats.

In the subject system, a 360 degree video capture device captures the 360 degree video data as raw camera data, a 360 degree video stitching device stitches the raw camera data and stores it in the CEP format. A 360 degree video encoding device compresses and transmits the 360 degree video data, and a 360 degree video decoding device decompresses the 360 degree video data. On the receiver side, a 360 degree video rendering engine directly renders viewports (for display) from the CEP format, or converts the 360 degree video data in CEP format to other supported format (e.g. ERP) before rendering and displaying the 360 degree video data.

In the subject system, the characteristics of ERP and EAP are integrated into a single projection format, namely a combined projection format. Control parameters such as α and are used to control resampling resolution in both horizontal and vertical directions, respectively. While α controls column resampling resolution w.r.t. the latitude, β controls line resampling resolution w.r.t. the latitude in the projected 360 degree video pictures. With the ability of controlling resampling resolution in both directions, better trade-offs can be made between viewport quality and memory bandwidth consumption. Along with other video parameters, the CEP control parameters (α, β) are signaled in the 360 degree video bitstream with any proper means such as high-level syntax, SEI (Supplemental Enhancement Information) messages, or signaled in the system layer. The control parameters (α, β) may be fixed, and may change from time to time based on video characteristics, transmission bandwidth, memory bandwidth for rendering or the like.

FIG. 1 illustrates an example network environment 100 in which 360 degree video capture and playback can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes a 360 degree video capture device 102, a 360 degree video stitching device 104, a video encoding device 106, a transmission link or storage media, a video decoding device 108, and a 360 degree video rendering device 110. In one or more implementations, one or more of the devices 102, 104, 106, 108, 110 may be combined into the same physical device. For example, the 360 degree video capture device 102, the 360 degree video stitching device 104, and the video encoding device 106 may be combined into a single device, and the video decoding device 108 and the 360 degree video rendering device 110 may be combined into a single device. In some aspects, the network environment 100 may include a storage device 114 that stores the encoded 360 degree video (such as on DVDs, Bluray, Digital Video Recording (DVR) at the cloud or gateway/set-top box, etc.) and then played back on a display device (e.g., 112).

The network environment 100 may further include a 360 degree video projection format conversion device (not shown) that may perform 360 degree video projection format conversion before the video encoding by the video encoding device 106. The network environment 100 may also include a 360 degree video projection format conversion device (not shown) that is inserted between video decoding device 108 and 360 degree video rendering device 110. In one or more implementations, the video encoding device 106 may be communicatively coupled to the video decoding device 108 via a transmission link, such as over a network.

In the subject system, the 360 degree video stitching device 104 may utilize an additional coordinate system that provides more freedom on the 360 degree video capture side when projecting captured 360 degree video to a 2D input picture coordinate system for storage or transmission. Such an additional coordinate system may enable e.g., global rotation of the captured 360 degree video before stitching for better compression efficiency. The 360 degree video stitching device 104 may also support multiple projection formats for 360 degree video storage, compression, transmission, decoding, rendering, etc. The 360 degree video stitching device 104 may remove overlapped areas captured by a camera rig, and output e.g. six view sequences that each covers a 90°×90° viewport. The 360 degree video projection format conversion device (not shown) may convert an input 360 degree video projection format (e.g. cube map projection format) to an output 360 degree video projection format (e.g. the equirectangular format). In some aspects, CMP (cube map projection format) maps a sphere onto six square cube faces, each of which covers 90°×90° degree of sphere.

In FIG. 1, the 360 degree video is captured by a camera rig, and stitched together into the equirectangular format. The video is then compressed into any suitable video compression format (e.g. MPEG/ITU-T AVC/H.264, MPEG/ITU-T HEVC/H.265, VP9 etc.) and transmitted via transmission link (e.g. cable, satellite, terrestrial, internet streaming, etc.). On the receiver side, the video is decoded (e.g., 108) and stored in the equirectangular format, then is rendered (e.g., 110) according to the viewing direction angles and field of view (FOV) angles, and displayed (e.g., 112). In the subject system, the end-users have control of FOV angles and viewing direction angles in order to view the 360 degree video at desired viewing directions and FOV angles.

Coordinate Systems

There are multiple coordinate systems that apply to the subject technology, including, but not limited to:

(x, y, z)—3D 360 degree video capture (camera) coordinate system.

(x', y', z')—3D 360 degree video viewing coordinate system.

$(x_p, y_p)$—2D normalized projection coordinate system, where $x_p \in [0.0:1.0]$ and $y_p \in [0.0:1.0]$.

$(X_p, Y_p)$—2D input picture coordinate system, with $X_p \in [0:\text{inputPicWidth}-1]$ and $Y_p \in [0:\text{inputPicHeight}-1]$, where inputPicWidth×inputPicHeight is input picture size of a color component (e.g. Y, U or V).

$(x_c, y_c)$—2D normalized rendering coordinate system, with $x_c \in [0.0:1.0]$ and $y_c \in [0.0:1.0]$.

$(X_c, Y_c)$—2D output rendering picture coordinate system, with $X_c \in [0:\text{renderingPicWidth}-1]$ and $Y_c \in [0:\text{renderingPicHeight}-1]$, where picWidth×picHeight is the output rendering picture size of a color component (e.g. Y, U or V).

$(x_r, y_r, z_r)$—3D 360 degree video projection coordinate system.

Figure 2:
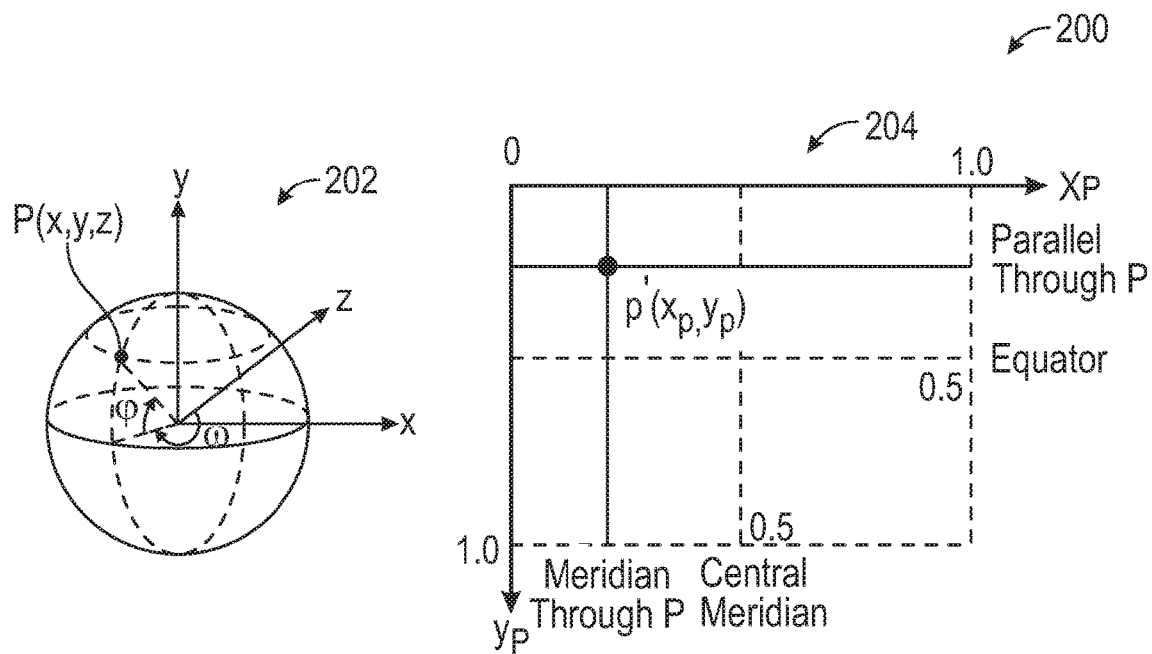
FIG. 2 conceptually illustrates an example of an equirectangular projection format in accordance with one or more implementations of the subject technology.

FIG. 2 conceptually illustrates an example of an equirectangular projection format 200. The equirectangular projection format 200 represents a standard way of texture mapping a sphere in computer graphics. It is also known as equidistant cylindrical projection, geographic projection, plate cane or carte parallelogrammatique. As shown in FIG. 2, to project a sphere surface point p(x, y, z) (e.g., 202) to a sample p'($x_p$, $y_p$) in the normalized projection coordinate system (e.g., 204), both longitude ω and latitude φ are computed for p(x, y, z) according to Equation 1.

$$\begin{cases} \omega = \arctan2(x, z) \\ \varphi = \arcsin\left(\frac{y}{\sqrt{x^2 + y^2 + z^2}}\right) \end{cases} \quad \text{Equation 1}$$

where $\omega \in [-\pi:\pi]$ and $\varphi \in [-\pi/2:\pi/2]$. π is the ratio of a circle's circumference to its diameter, commonly approximated as 3.1415926.

The equirectangular projection format 200 may be defined as in Equation 2:

$$\begin{cases} x_p = \dfrac{\omega}{2\pi} + 0.5 \\ y_p = -\dfrac{\varphi}{\pi} + 0.5 \end{cases} \qquad \text{Equation 2}$$

where $x_p \in [0.0:1.0]$ and $y_p \in [0.0:1.0]$. $(x_p, y_p)$ is the coordinate in the normalized projection coordinate system.

Figure 3:
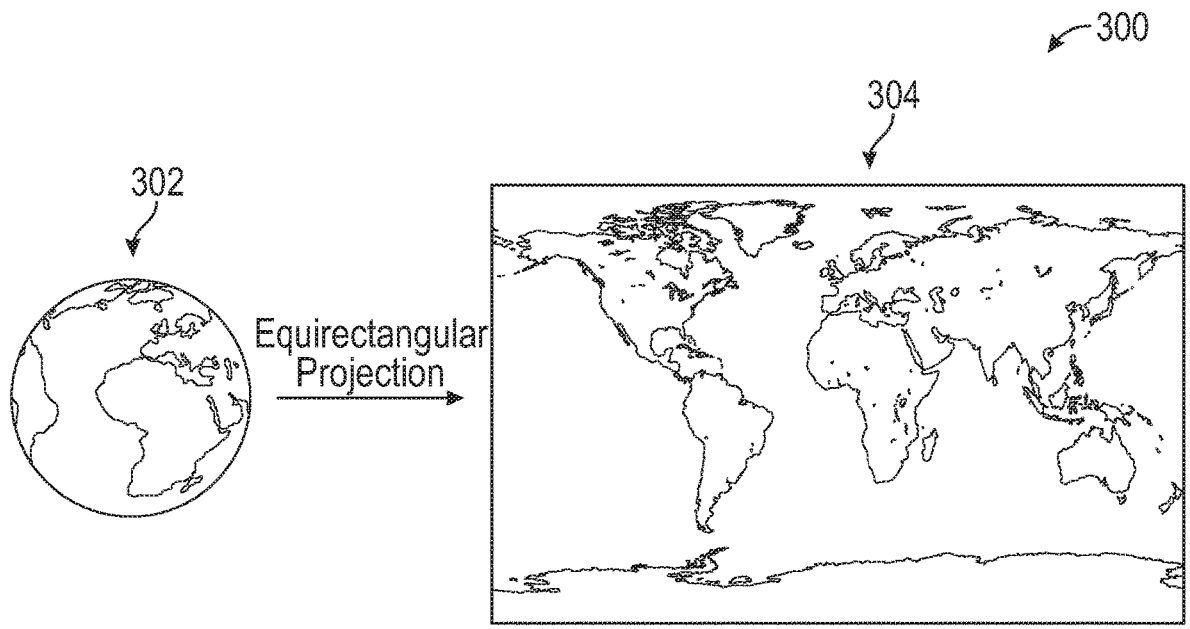
FIG. 3 conceptually illustrates an example of an equirectangular projection with Earth map in accordance with one or more implementations of the subject technology.

FIG. 3 conceptually illustrates an example of an equirectangular projection layout 300 with Earth map. In the equirectangular projection layout 300, the picture has 1:1 mapping along the equator only, and is stretched elsewhere. The largest mapping distortion occurs at north and South Pole of a sphere (e.g., 302), where a single point is mapped to line of samples on the equirectangular projection picture (e.g., 304), resulting in lots of redundant data in the composed 360 degree video using the equirectangular projection layout 300.

In addition to the equirectangular projection format, there are many other projection formats that can represent a 360 degree video frame on a 2-D rectangular image, one of them is so-called equal area projection (EAP), which is defined as:

$$\begin{cases} x_p = \dfrac{\omega}{2\pi} + 0.5 \\ y_p = -\dfrac{\sin\varphi}{\pi} + 0.5 \end{cases} \qquad \text{Equation 3}$$

where $x_p \in [0.0:1.0]$ and $y_p \in [0.0:1.0]$. $(x_p, y_p)$ is the coordinate in the normalized projection coordinate system.

Figure 4:
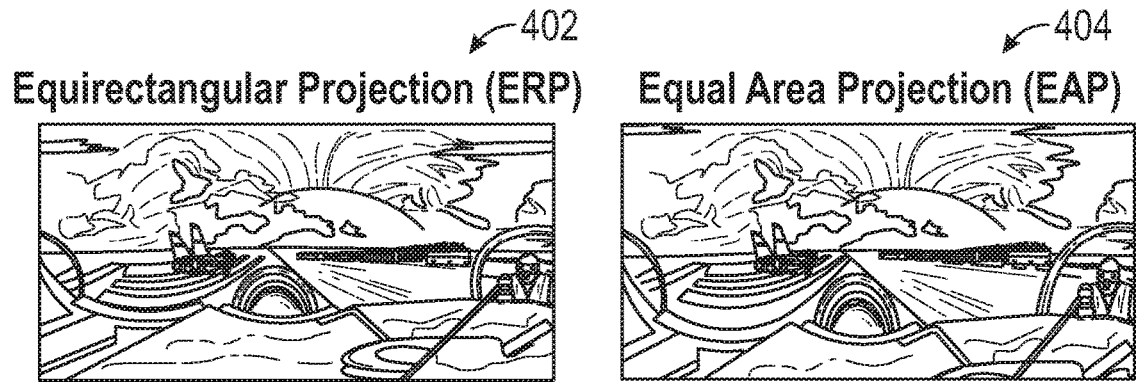
FIG. 4 conceptually illustrates an example of a 360 degree video picture in equirectangular projection (ERP) and equal area projection (EAP) format in accordance with one or more implementations of the subject technology.

FIG. 4 conceptually illustrates an example of a 360 degree video picture in ERP and EAP format in accordance with one or more implementations of the subject technology. In ERP format, samples are evenly distributed in both directions (e.g., vertical, horizontal) in a projected 360 degree video picture (e.g., 402). In EAP format, however, the samples are evenly distributed in the horizontal direction only, but are unevenly distributed in the vertical direction (e.g., 404). As shown in FIG. 4, the sample lines in the EAP format (e.g., 404) are squeezed around the North and South poles (i.e., the top and bottom regions of a 360 degree video picture), and are stretched along the equator (i.e., the middle region of the 360 degree video picture).

In some aspects, this can be mathematically explained by Equations 2 and 3, in which the number of sample lines per latitude degree, i.e., $$\left| \dfrac{\partial y_p}{\partial \varphi} \right|,$$

for the ERP format is a constant over the entire latitude range (e.g., $[-\pi/2 : \pi/2]$). The latitude range can be derived from Equation 2:

$$\left| \dfrac{\partial y_p}{\partial \varphi} \right| = \dfrac{1}{\pi}, \varphi \in \left[ -\dfrac{\pi}{2} : \dfrac{\pi}{2} \right] \qquad \text{Equation 4}$$

While for the EAP format, the latitude range is a cosine function of latitude as derived from Equation 3:

$$\left| \dfrac{\partial y_p}{\partial \varphi} \right| = \dfrac{\cos\varphi}{\pi}, \varphi \in \left[ -\dfrac{\pi}{2} : \dfrac{\pi}{2} \right] \qquad \text{Equation 5}$$

As shown in Equation 5, the number of sample lines per latitude degree (i.e. line resampling resolution) around the North Pole (i.e. $\varphi = \pi/2$) and the South Pole (i.e. $\varphi = -\pi/2$), in the EAP format, approaches to zero, which could adversely affect the quality in the rendered viewports of those areas.

Figure 5:
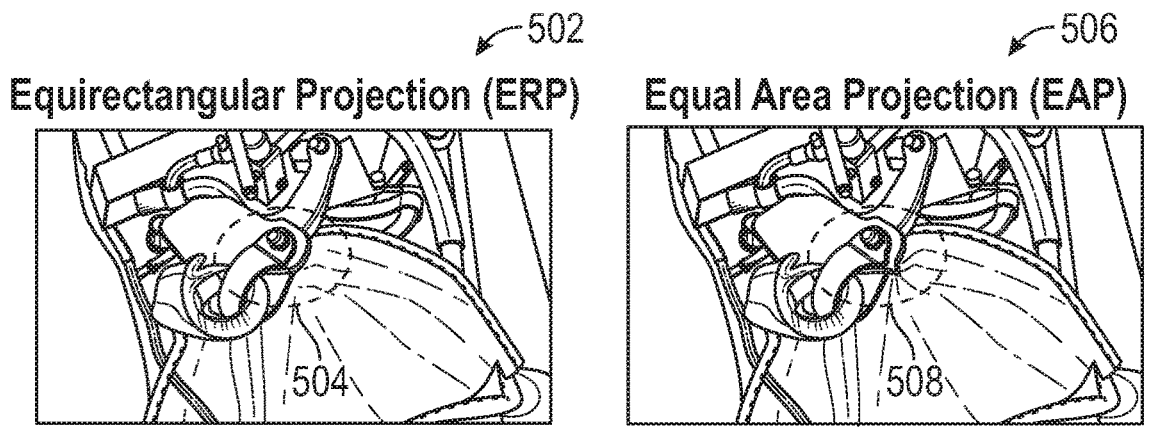
FIG. 5 conceptually illustrates an example of a viewport quality comparison between ERP and EAP around a south pole in accordance with one or more implementations of the subject technology.

FIG. 5 conceptually illustrates an example of a viewport quality comparison between ERP and EAP around a south pole in accordance with one or more implementations of the subject technology. In FIG. 5, the viewport quality of EAP (e.g., 506) is severely distorted in the center of the viewport (e.g., 508) when compared to the center of the viewport (e.g., 504) of ERP (e.g., 502).

For a same 360 degree video content, different projection formats may lead to different compression efficiency rates after the video is compressed with a certain video compression standard (e.g., MPEG/ITU AVC/H.264 or MPEG/ITU MPEG HEVC/H.265). The different projection format also may lead to different amounts of memory bandwidth consumption for viewport rendering. In Table 1, shown below, provides a listing of compression efficiency rates and memory bandwidth consumption rates for ten 4K 360 degree video test sequences, and their differences between the ERP and EAP formats.

The compression efficiency rate difference in Table 1 is computed with dynamic viewport PSNRs, in which negative numbers mean better compression efficiency of using EAP, and positive numbers mean better compression efficiency of using ERP. For computing dynamic viewport peak signal-to-noise ratios (PSNRs), where a total number of 300 evenly distributed viewing directions on a sphere are pre-sampled. In some aspects, the sampled viewing directions are looped through a reconstructed sequence (after compression and decompression), so that a frame in the sequence is assigned to one viewing direction. In some aspects, a single viewport for the frame is rendered for the assigned viewing direction with a FOV angle of 100×68 degrees and rendering picture size of 1920×1080. In some aspects, the PSNR is calculated between the rendered viewport and the anchor viewport, which is rendered from the corresponding frame of the original sequence by using the same viewing direction. In some aspects, the average PSNR is computed over the sequence to obtain the viewport PSNR.

Table 1 shows experimental results on compression efficiency and rendering memory bandwidth consumption of EAP relative to ERP using a known video compression standard (e.g., using the HEVC Main-10 Profile reference software HM16.14). The memory bandwidth numbers shown in Table 1 are the EAP numbers relative to the ERP peak and average memory bandwidth numbers, respectively. As shown in Table 1, the peak memory bandwidth of EAP is about 65.1% of ERP, but the EAP consumes about 22.4% more memory bandwidth on average (over the 300 selected viewing directions) when compared to the ERP. The overall values for the EAP provide better compression efficiency than the ERP by distributing sample lines unevenly in the vertical direction during the projection process that maps a sphere to a 2D plane.

TABLE 1

Compression Efficiency of ERP relative to EAP

| Sequence | anchor (ERP) tested (EAP) | | All Intra Main-10 ViewPort PSNR | | | Random Access Main-10 ViewPort PSNR | | | Low-Delay B Main-10 ViewPort PSNR | | | Memory Bandwidth | |
|---|---|---|---|---|---|---|---|---|---|---|---|---|---|
| | picW | picH | Y | U | V | Y | U | V | Y | U | V | Peak | Average |
| Tain | 4096 | 2048 | −17.7% | −4.2% | −4.2% | −14.2% | 1.3% | 0.3% | −12.6% | 1.3% | 0.7% | 63.84% | 125.00% |
| Skateboarding_trick | 4096 | 2048 | −12.3% | −1.2% | −0.8% | −16.6% | −3.3% | −2.8% | −14.8% | −2.8% | −3.7% | 63.84% | 125.00% |
| Skateboarding_in_lot | 4096 | 2048 | −31.2% | −11.1% | −9.3% | −36.1% | −18.1% | −18.0% | −37.0% | −20.4% | −20.6% | 63.84% | 125.00% |
| Chairlift | 4096 | 2048 | −19.8% | −12.5% | −11.6% | −26.8% | −19.2% | −18.7% | −24.2% | −16.2% | −13.2% | 63.84% | 125.00% |
| KiteFlite | 4096 | 2048 | −22.9% | −9.7% | −10.4% | −24.3% | −8.8% | −9.3% | −24.0% | −9.6% | −10.5% | 63.84% | 125.00% |
| Harbor | 4096 | 2048 | −26.2% | −8.1% | −9.3% | −28.2% | −3.9% | −5.7% | −23.3% | 0.7% | 0.3% | 63.84% | 125.00% |
| PoleVault | 3328 | 1664 | −7.4% | −5.3% | −5.6% | −13.7% | −10.4% | −12.3% | −18.3% | −16.0% | −16.5% | 66.99% | 118.45% |
| AerialCity | 3328 | 1664 | −7.1% | −3.0% | −2.6% | −13.7% | −6.9% | −6.0% | −19.3% | −11.1% | −9.1% | 66.99% | 118.45% |
| DrivingInCity | 3328 | 1664 | −13.4% | 2.0% | 3.0% | −11.7% | 7.7% | 9.4% | −8.6% | 11.6% | 13.5% | 66.99% | 118.45% |
| DirvingInCountry | 3328 | 1664 | −12.9% | −3.2% | −2.4% | −26.9% | −14.1% | −14.5% | −29.6% | −15.9% | −15.4% | 66.99% | 118.45% |
| Overall | | | −17.1% | −5.6% | −5.3% | −21.2% | −7.6% | −7.6% | −21.2% | −7.6% | −7.4% | 65.1% | 122.4% |

Figure 6:
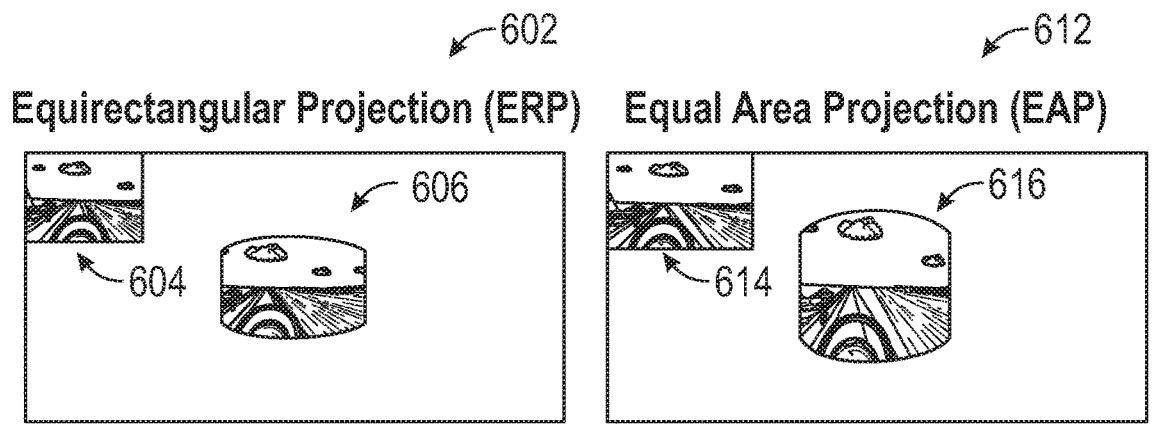
FIG. 6 conceptually illustrates examples of references pictures in ERP and EAP formats for rendering around an equator in accordance with one or more implementations of the subject technology.

FIG. 6 conceptually illustrates examples of references picture areas in ERP (e.g., 602) and EAP (e.g., 612) formats used for rendering around an equator in accordance with one or more implementations of the subject technology. The reference picture areas of FIG. 6 can explain why the EAP consumes more bandwidth than the ERP on average (see Table 1). The ERP picture 602 includes ERP data for the rendered viewport on the top-left of the ERP image (e.g., 604) and the corresponding reference picture area used for rendering in the middle of the image (e.g., 606). The viewing direction for rendering is the front view on the Equator. The EAP picture 612 includes EAP data with the same viewing direction. As shown in FIG. 6, for the viewport rendering of a same size (e.g., 604 and 614), the EAP needs to fetch more reference data for the fact that the EAP has a higher line resampling resolution in the middle of a sphere (e.g., 616) for a same vertical FOV angle (e.g., 68 degrees). Since the majority of 300 selected viewports are sampled in the middle of the sphere (e.g., 616), the average memory bandwidth consumed by the viewport rendering for 360 degree video in the EAP format is higher than that of the ERP format.

Figure 7:
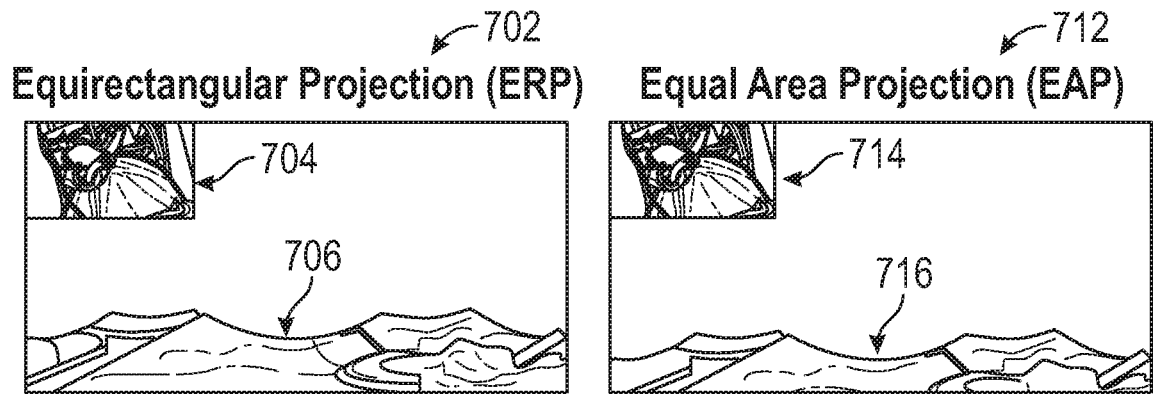
FIG. 7 conceptually illustrates examples of references pictures in ERP and EAP formats for rendering around a south pole in accordance with one or more implementations of the subject technology.

FIG. 7 conceptually illustrates examples of references picture areas in ERP (e.g., 702) and EAP (e.g., 712) formats used for rendering around a south pole in accordance with one or more implementations of the subject technology. The example given in FIG. 7 explains why the EAP consumes less peak bandwidth than the ERP (see Table 1). In FIG. 7, the ERP picture 702 includes ERP data with the rendered viewport on the top-left of the image (e.g., 704) and the corresponding reference picture area used for rendering at the bottom of the image (e.g., 706). The viewing direction for rendering is directly facing the South Pole, which is the worst case (or peak) of the memory bandwidth consumption. The EAP picture 712 includes EAP data with the same viewing direction (e.g., 714). Since the EAP has a lower line resampling resolution around the North and South poles (e.g., 716) for a same vertical FOV angle, the peak memory bandwidth of the EAP is much lower than that of the ERP.

In some aspects, a drawback of the ERP is that the peak memory bandwidth consumption is significantly higher compared to the EAP and the memory bandwidth consumption is very much unbalanced between the peak and average cases. As noted in Table 1, the average memory bandwidth of ERP for a case of over the 300 selected viewing directions is about 45% of the peak memory bandwidth, while the same number over the selected viewing directions for the EAP is about 85%. In terms of memory bandwidth consumption for rendering, the EAP is advantageous over the ERP for the lowered peak memory bandwidth consumption and has significantly more balanced memory bandwidth consumption between the peak and average cases. However, the EAP is likely to have viewport quality issues around the North and South poles due to ultra-low line resampling resolution in those areas (see 508 in FIG. 5). Therefore, it is desirable to design a projection format that lowers the peak memory bandwidth consumption while preserving the compression efficiency and viewport quality in the North and South Pole areas.

To meet the above-mentioned design goal, a combined projection format (generally referred to as "CEP") is proposed. The CEP integrates the characteristics of ERP and EAP into a single projection format. The combined projection format is defined as:

$$\begin{cases} x_p = \dfrac{\omega \cos(\alpha\varphi)}{2\pi} + 0.5 \\ y_p = -\dfrac{0.5\sin(\beta\varphi)}{\sin\dfrac{\beta\pi}{2}} + 0.5 \end{cases} \quad \text{Equation 6}$$

where $x_p \in [0.0:1.0]$, $y_p \in [0.0:1.0]$, a $\in [0.0:1.0]$, $\beta \in [0.0:1.0]$. The pairing $(x_p, y_p)$ is the coordinate in the normalized projection coordinate system. The combined projection format includes control parameters $(\alpha, \beta)$ that are used to control resampling resolution in the horizontal and vertical directions, respectively. While the first control parameter, $\alpha$, controls the column resampling resolution with respect to the latitude, the second control parameter, $\beta$, controls the line resampling resolution with respect to the latitude in the projected 360 degree video pictures. With the ability of controlling resampling resolution in both directions, better trade-offs can be made between viewport quality and memory bandwidth consumption.

With the CEP definition of Equation 6, the ERP and EAP become a special case of the CEP, namely:

$(\alpha=0, \beta=0) \rightarrow$ ERP $(\alpha=0, \beta=1) \rightarrow$ EAP

Figure 8:
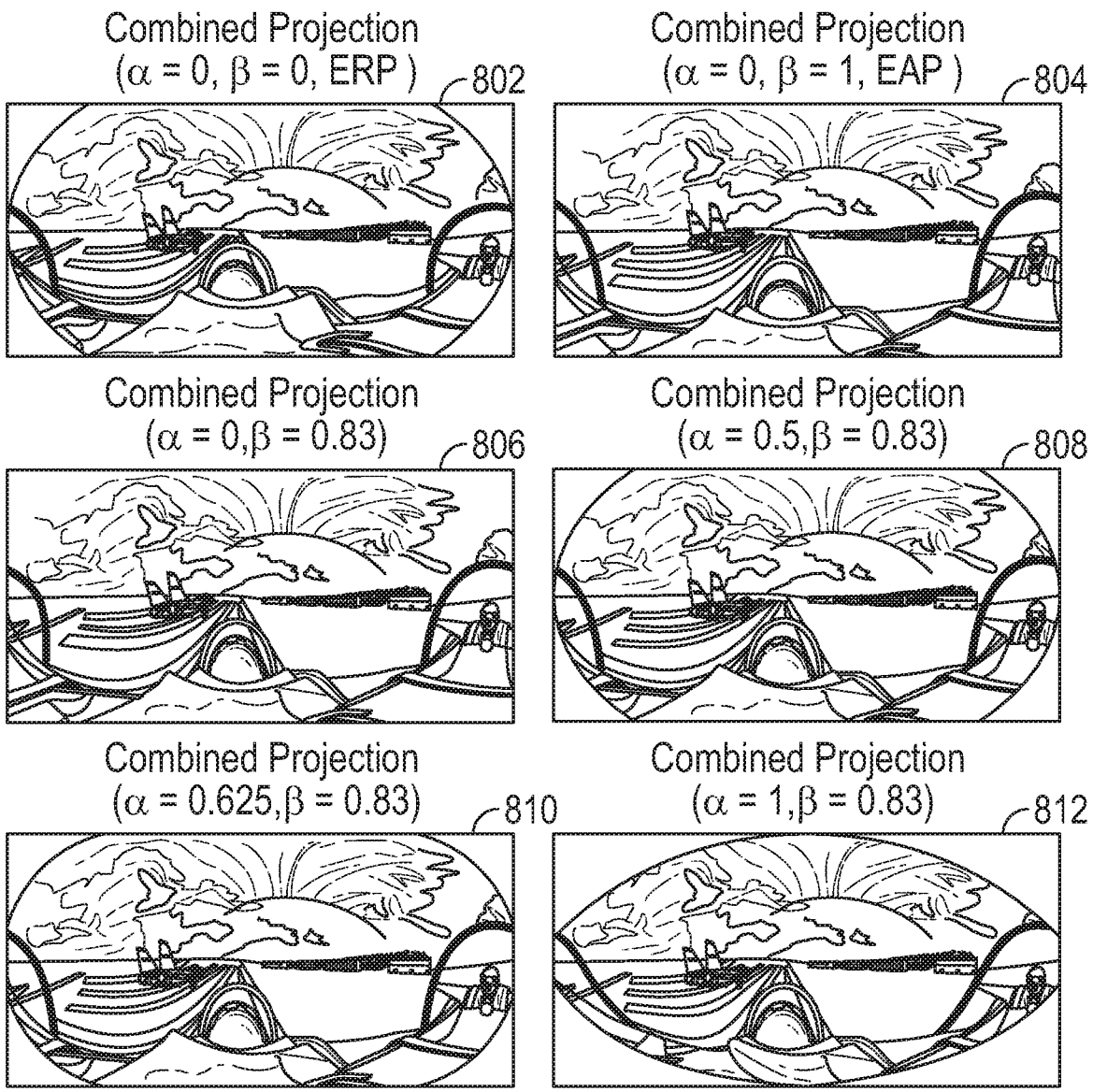
FIG. 8 conceptually illustrates examples of combined projection layouts with different alpha and beta settings in accordance with one or more implementations of the subject technology.

By adjusting the control parameters $(\alpha, \beta)$, a variety of CEP layouts can be produced. FIG. 8 conceptually illustrates examples of combined projection format layouts with different alpha and beta settings in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

Generally speaking, increasing ($\alpha$, $\beta$) lowers the column and line resampling resolution around the North and South Pole area when mapping the sphere to a 2D plane, and thus reduces the peak memory bandwidth consumption, and vice versa. For example, a first image 802 with the combined projection format has $\alpha=0$ and $\beta=0$, which represents the ERP format. In some aspects, a second image 804 with the combined projection format has $\alpha=0$ and $\beta=1$, which represents the EAP format. In some aspects, a third image 806 with the combined projection format has $\alpha=0$ and $=0.83$, which alters the line resampling resolution by 0.17 from the EAP setting. In some aspects, a fourth image 808 with the combined projection format has $\alpha=0.5$ and $\beta=0.83$, which alters the column resampling resolution by 0.5 while the line resampling resolution remains unchanged with respect to the image 806. In some aspects, a fifth image 810 with the combined projection format has $\alpha=0.625$ and $\beta=0.83$, which further alters the column resampling resolution by 0.15 while the line resampling resolution remains unchanged with respect to the image 808. In some aspects, a sixth image 812 with the combined projection format has $\alpha=1.0$ and $\beta=0.83$, which further alters the column resampling resolution by 0.375 while the line resampling resolution remains unchanged with respect to the image 810.

Figure 9:
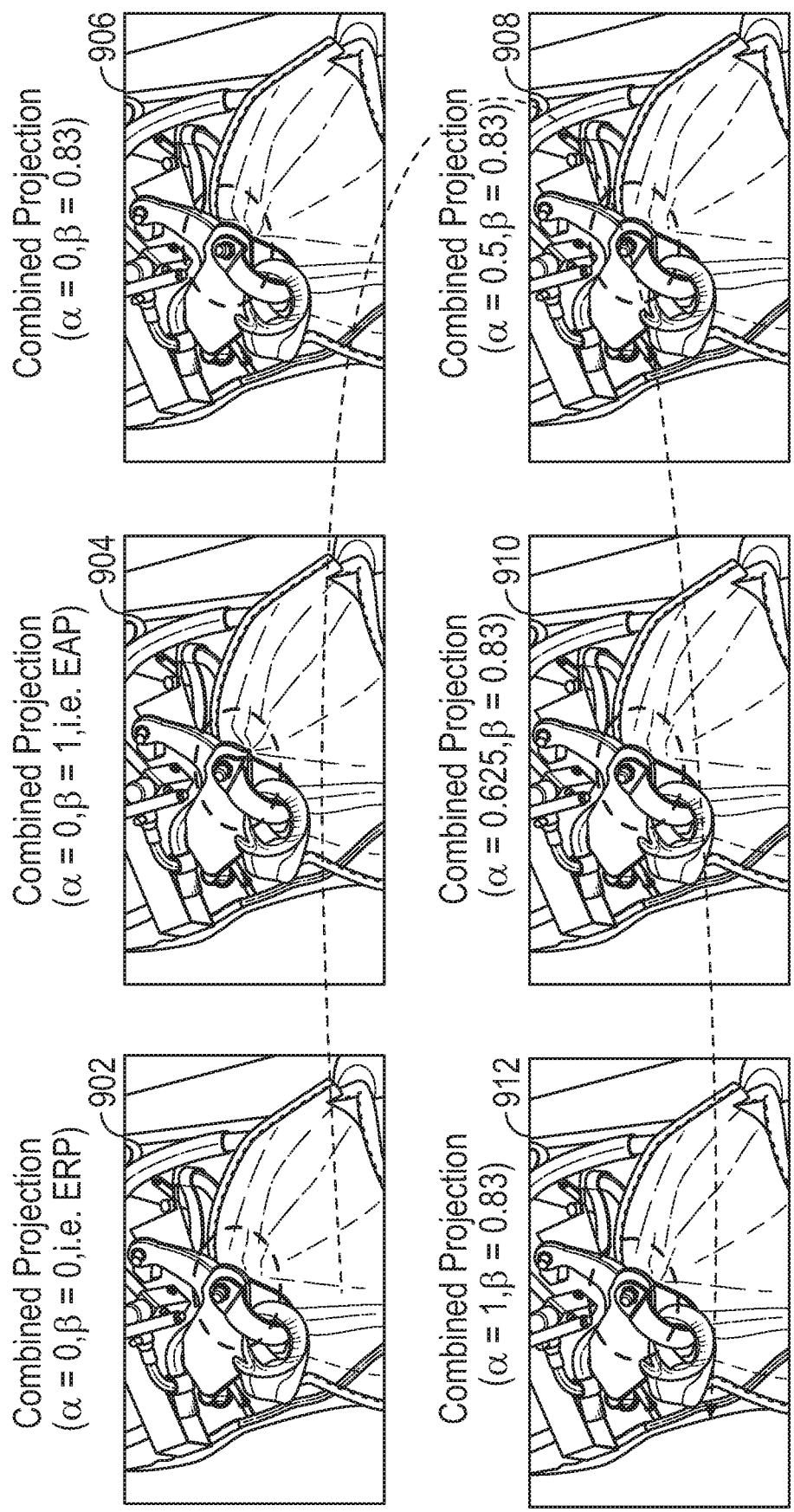
FIG. 9 conceptually illustrates examples of a viewport quality comparison of pictures around a south pole in the combined projection format with different alpha and beta settings in accordance with one or more implementations of the subject technology.

FIG. 9 conceptually illustrates examples of a viewport quality comparison of pictures around a south pole in the combined projection format with different alpha and beta settings in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

FIG. 9 illustrates how the resampling resolution, and hence, the viewport quality can be controlled by adjusting the control parameters ($\alpha$, $\beta$) in the CEP format. Starting from image 902, the CEP format with the control parameters set to $\alpha=0$ and $\beta=0$ (i.e., ERP) has the highest viewport quality as the ERP has the highest resampling resolution around the pole. By increasing the value from 0 to 1, the CEP format becomes the EAP format, where $\alpha=0$ and $\beta=1$. With these control parameter settings, the center portion of the viewport becomes distorted due to ultra-low line resampling resolution around the pole of image 904. By decreasing the $\beta$ value to 0.83 to increase the line resampling resolution around the pole of image 906, the viewport quality becomes better in the image, where the control parameters have been adjusted to $\alpha=0$ and $\beta=0.83$. By increasing the $\alpha$ value from 0 to 0.5 (e.g., 908) and then to 0.625 (e.g., 910) to decrease the column resampling resolution, the viewport quality gradually decreases but is still better than that of EAP. By increasing the $\alpha$ value to 1 leads to a clearly blurred viewport in image 912, where the control parameters have been adjusted to $\alpha=1.0$ and $\beta=0.83$.

Figure 10:
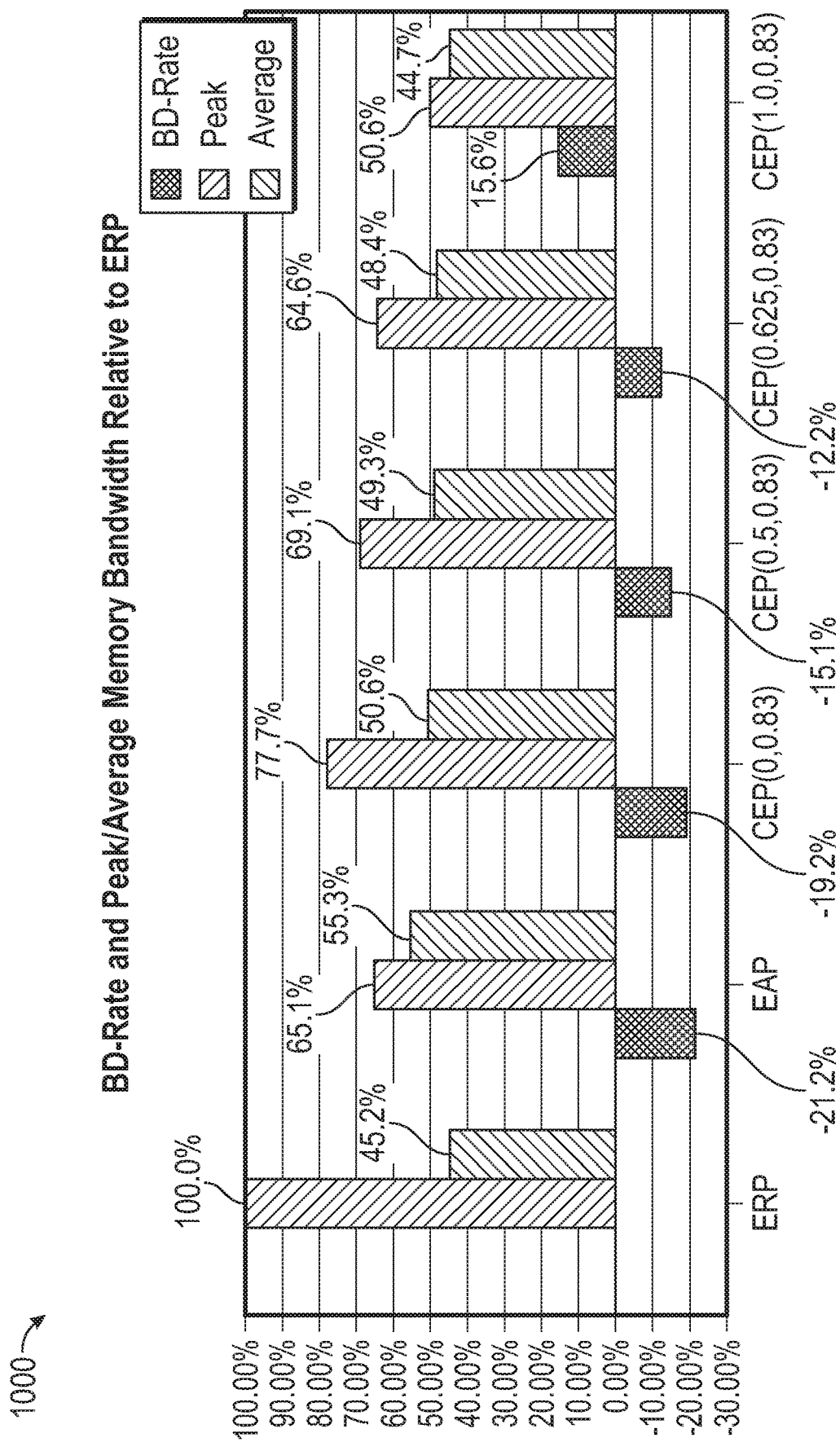
FIG. 10 illustrates a plot depicting a performance comparison of different combined ERP/EAP projection (CEP) layouts in accordance with one or more implementations of the subject technology.

FIG. 10 illustrates a plot 1000 depicting a performance comparison of different CEP layouts in accordance with one or more implementations of the subject technology. FIG. 10 provides a two-dimensional plot that summarizes the compression efficiency rate for random access configuration with a certain video compression standard (e.g., using HEVC Main-10 Profile reference software HM16.14) and memory bandwidth consumption numbers for different CEP layouts, where the efficiency and consumption numbers are listed on the y-axis and the different CEP layouts are listed in the x-axis. The results shown in FIG. 10 are the average result over the ten 4K test sequences listed in Table 1. In some aspects, the compression efficiency rate is measured relative to ERP, where a positive number refers to a loss relative to the ERP, and a negative number refers to a gain relative to the ERP. In some aspects, the memory bandwidth is computed relative to the ERP peak bandwidth. As shown in FIG. 10, the CEP format can trade the compression efficiency with memory bandwidth consumption by adjusting the control parameters ($\alpha$, $\beta$), and can achieve a better balance among compression efficiency, viewport quality, peak and average memory bandwidth consumption when compared to the ERP and EAP.

Figure 11:
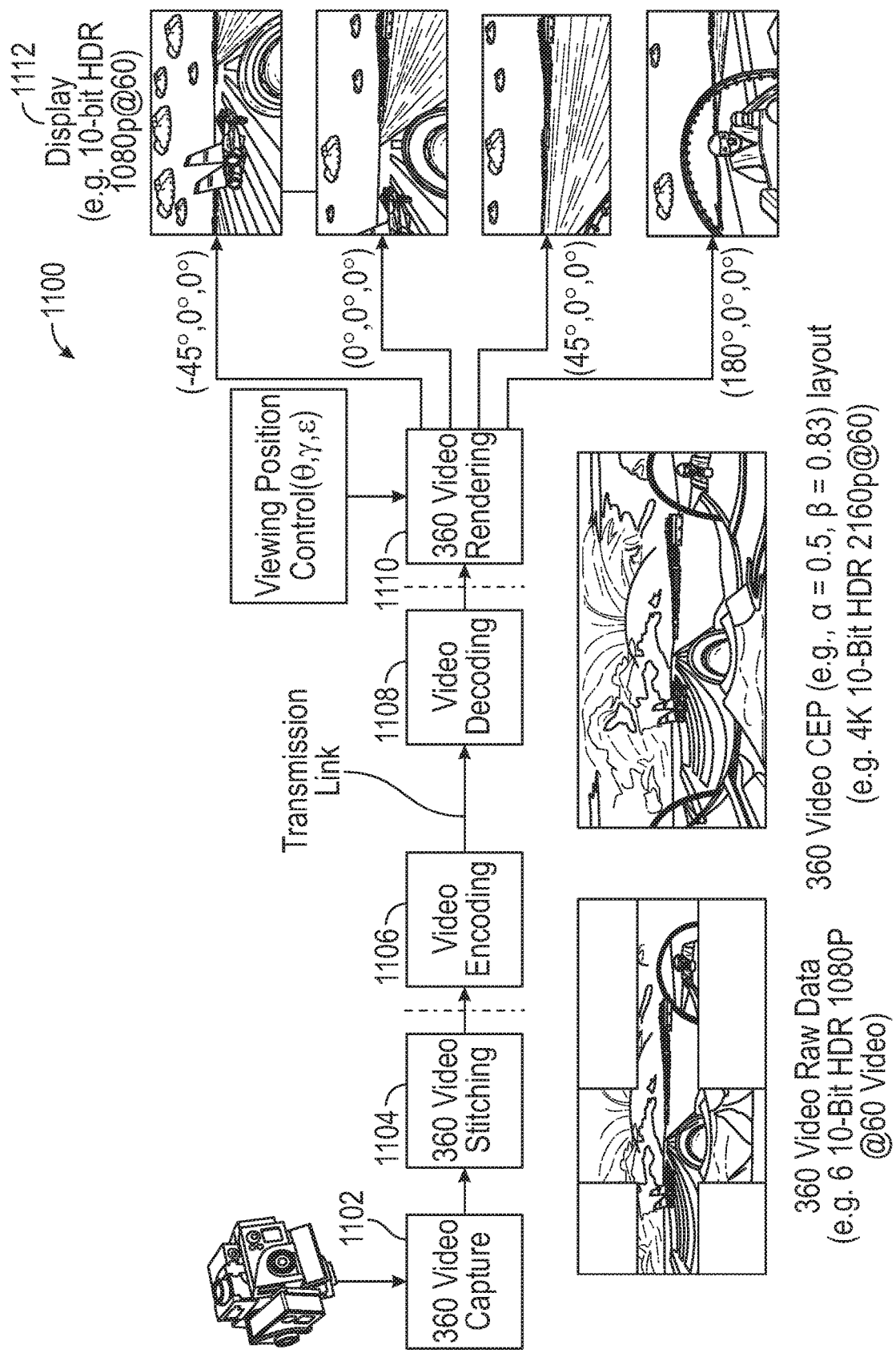
FIG. 11 illustrates a schematic diagram of an example of a 360 degree video capture and playback system with combined projection format in accordance with one or more implementations of the subject technology.

FIG. 11 illustrates an example network environment 1100 in which 360 degree video capture and playback can be implemented in accordance with one or more implementations. Not all of the depicted components may be used, however, and one or more implementations may include additional components not shown in the figure, such as one or more 360 degree video projection format conversion devices. Variations in the arrangement and type of the components may be made without departing from the spirit or scope of the claims as set forth herein. Additional components, different components, or fewer components may be provided.

The example network environment 1100 includes a 360 degree video capture device 1102, a 360 degree video stitching device 1104, a video encoding device 1106, a video decoding device 1108, and a 360 degree video rendering device 1110. In one or more implementations, one or more of the devices 1102, 1104, 1106, 1108, 1110 may be combined into the same physical device. For example, the 360 degree video capture device 1102, the 360 degree video stitching device 1104, and the video encoding device 1106 may be combined into a single device, and the video decoding device 1108 and the 360 degree video rendering device 1110 may be combined into a single device.

The network environment 1100 may also include a 360 degree video playback device (not shown) that plays back the rendered 360 degree video content. In one or more implementations, the video encoding device 1106 may be communicatively coupled to the video decoding device 1108 via a transmission link, such as over a network.

In some implementations, the raw camera data is stitched (e.g., 1104) and stored in the CEP format, then compressed (e.g., 1106), transmitted and decompressed (e.g., 1108). In the subject system, any suitable video compression standards (e.g., MPEG/ITU-T AVC/H.264, MPEG/ITU-T HEVC/H.265, VP9, and etc.) may be used for compression of a 360 degree video sequence in the CEP format. In one or more implementations, a 360 degree video picture may be partitioned into sub-pictures. For example, using Motion-Constrained Tile Sets (MCTS), a SEI message defined by the MPEG/ITU-T HEVC/H.265 for 360 degree video applications, can divide a compressed 360 degree video bitstream into independently decodable tile sub-streams in which motion compensation does not cross tile boundaries.

In some implementations, the 360 degree video rendering device 1110 may directly render viewports (for display) from the decoded 360 degree video sequence in the CEP format. In some implementations, the 360 degree video rendering device 1110 may not support viewport rendering from the CEP format. A 360 degree video projection format conversion device (not shown) may be used to convert the decoded 360 degree video from the CEP format to one of projection formats (e.g., ERP) supported by the rendering device before rendering and display.

In one or more implementations, the CEP control parameters ($\alpha$, $\beta$) may be signaled along with other video coding parameters in the video elemental bitstream with any proper means such as high-level syntax, SEI messages, or signaled in the system layer. Control parameters ($\alpha$, $\beta$) may be fixed, and may change from time to time based on video characteristics, transmission bandwidth, memory bandwidth for rendering, etc.

Figure 12:
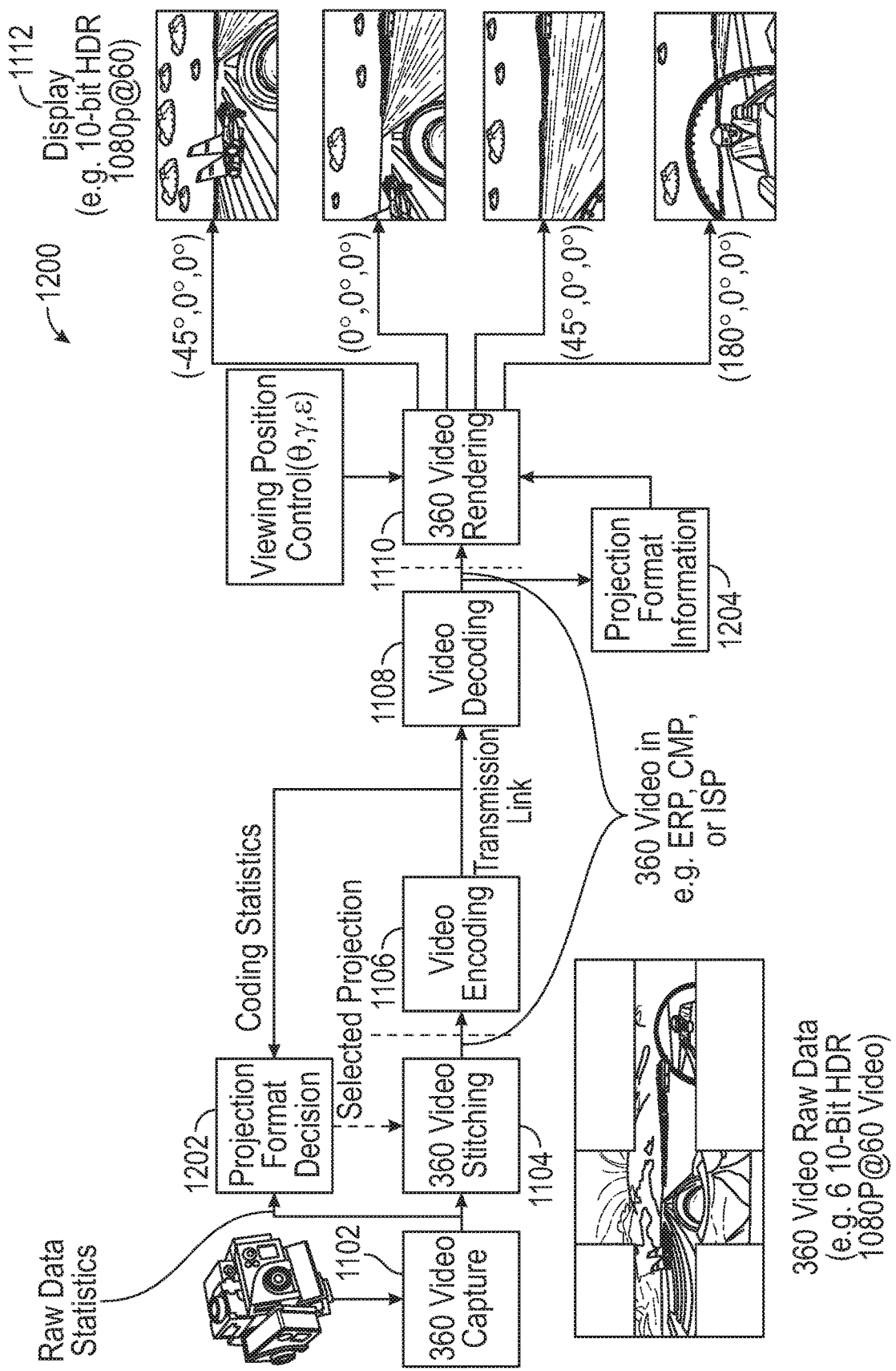
FIG. 12 illustrates a schematic diagram of an example of a 360 degree video capture and playback system with adaptive projection selection among CEP and other projection formats in accordance with one or more implementations of the subject technology.

FIG. 12 illustrates a schematic diagram of an example of a 360 degree video capture and playback system 1200 with adaptive projection format. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

In order to maximize the compression efficiency for 360 degree video, an adaptive method that can compress 360 degree video into mixed projection formats may be implemented. For example, the projection format may be adaptively selected for each captured 360 degree video picture or segment. The CEP format with adjustable control parameters can be one of multiple candidate projection formats available for such a system.

The network environment 1200 may further include a projection format decision device (e.g., 1202) that may perform projection format selection before the video stitching by the video stitching device (e.g., 1104). In some implementations, the 360 degree video stitching device 1104 may utilize the projection format decision device 1202 on the 360 degree video capture/compression side to decide which projection format (e.g. ERP, EAP, CMP, CEP, etc.) is best suited for the current video segment (i.e. a group of pictures) or the current picture to achieve the best possible compression efficiency. The decision can be made based on coding statistics (such as distribution of bit-rate, intra/inter modes across the segment or picture, video quality measurement, etc.) provided by the video encoding device (e.g., 1106), and/or raw data statistics (such as distribution of raw data spatial activities, etc.) obtained on the raw 360 degree video camera data from the 360 degree video capture device 1102. Once the projection format, e.g. CEP, is selected for the current segment or picture by the projection format decision device (e.g., 1202), the 360 degree video stitching device (e.g., 1104) stitches the video into the selected projection format and delivers the stitched 360 degree video to the video encoder (e.g., 1106) for compression. In the subject system, any suitable video compression standards (e.g., MPEG/ITU-T AVC/H.264, MPEG/ITU-T HEVC/H.265, VP9, and etc.) may be used for compression of a 360 degree video sequence in the selected projection format. A compressed 360 degree video bitstream may be also divided into independently decodable tile sub-streams by using e.g. MCTS.

The selected projection format and associated projection format parameters (such as projection format ID, ($\alpha$, $\beta$) values for CEP, number of faces in the projection layout, face size, face coordinate offsets, face rotation angles, etc.) are signaled in the compressed bitstream with any appropriate means such as in a SEI message, in a sequence header, in a picture header, etc. Different from the system illustrated in FIG. 11, the 360 degree video stitching device (e.g., 1104) in FIG. 12 is capable of stitching the 360 degree video into multiple projection formats selected by the projection format decision device (e.g., 1202), as opposed to stitching the video into a single and fixed projection format (e.g. ERP).

On the 360 degree video playback side, the video decoding device (e.g., 1108) receives the compressed 360 degree video bitstream, and de-compresses the video stream. Different from the system illustrated in FIG. 11, the 360 degree video rendering device (e.g., 1110) is capable of rendering 360 degree video of different projection formats signaled in the bitstream, including the CEP, as opposed to rendering the video in a single and fixed projection format (e.g. ERP). That is, the 360 degree video rendering is not only controlled by the viewing direction and FOV angles, but also controlled by the projection format information 1204 decoded from the bitstream.

Figure 13:
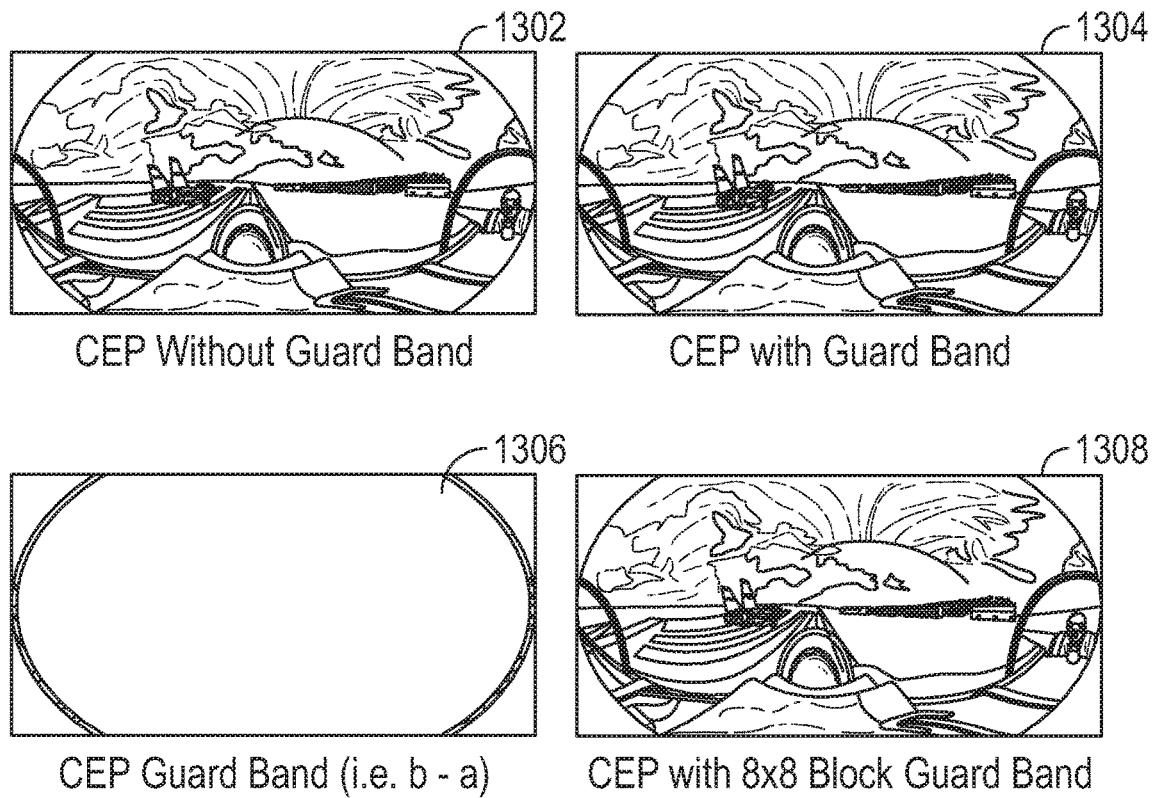
FIG. 13 conceptually illustrates an example of CEP layouts with and without guard band in accordance with one or more implementations of the subject technology.

FIG. 13 conceptually illustrates an example of CEP layouts with and without guard band in accordance with one or more implementations of the subject technology. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

For CEP layouts with reduced column resampling resolution (i.e. $\alpha$>0), there will be a non-active reference sample area in the 360 degree video picture. For example, in FIG. 13, where a CEP picture 1302 is produced by parameter setting ($\alpha$=0.5, $\beta$=0.83), there are samples around the four picture corners that do not contain active reference samples for rendering. Since the viewport rendering uses bilinear filtering or other filters of longer filter taps, the non-active corner areas can be accessed by viewport rendering if the viewing directions point to those areas. This may create artifacts in the rendered viewports since a rendered sample in those areas can be the weighted average of active and non-active reference samples. To avoid this symptom, a guard band may be inserted into the 360 degree video picture so that a viewport rendering does not need to detect whether the reference sample is an active or non-active sample during the rendering. An example of 360 degree video picture in the CEP format with the guard band inserted is shown in the CEP picture 1304. In some aspects, a CEP picture 1306 includes an inserted guard band that has approximately 2% padded samples. To further consider that video coding is normally block-based and the better compression efficiency is desired, the guard band can be made e.g. 8×8 block-based as shown in a CEP picture 1308. In some aspects, any appropriate means can be used to produce the guard band. In some implementations, the guard band can be applied to any other projection formats that contain non-active reference sample areas in 360 degree video picture. A guard band may also be useful for improving compression efficiency of 360 degree video and reducing rendering seam artifacts around discontinuous face boundaries.

Figure 14:
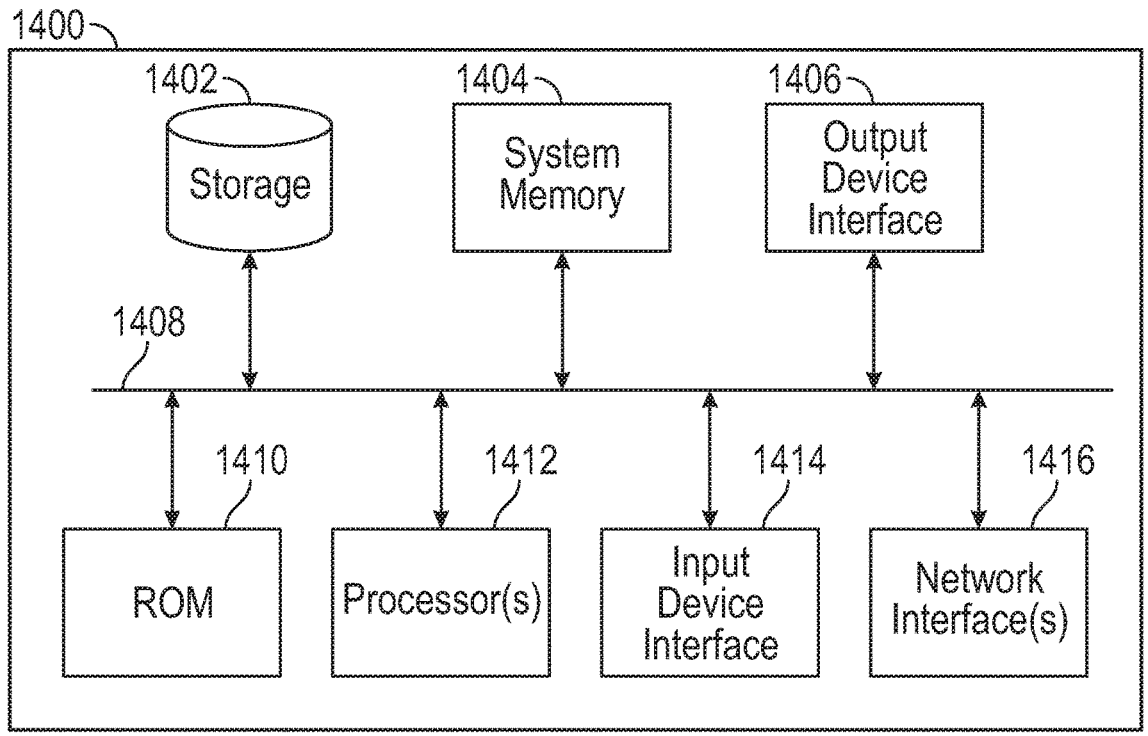
FIG. 14 conceptually illustrates an electronic system with which one or more implementations of the subject technology may be implemented.

FIG. 14 conceptually illustrates an electronic system 1400 with which one or more implementations of the subject technology may be implemented. The electronic system 1400, for example, can be a network device, a media converter, a desktop computer, a laptop computer, a tablet computer, a server, a switch, a router, a base station, a receiver, a phone, or generally any electronic device that transmits signals over a network. Such an electronic system 1400 includes various types of computer readable media and interfaces for various other types of computer readable media. In one or more implementations, the electronic system 1400 may be, or may include, one or more of the devices 102, 104, 106, 108, 110, the 360 degree video layout format conversion device, and/or the 360 degree video playback device. The electronic system 1400 includes a bus 1408, one or more processing unit(s) 1412, a system memory 1404, a read-only memory (ROM) 1410, a permanent storage device 1402, an input device interface 1414, an output device interface 1406, and a network interface 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system. The permanent storage device 1402, on the other hand, is a read-and-write memory device. The permanent storage device 1402 is a non-volatile memory unit that stores instructions and data even when the electronic system 1400 is off. One or more implementations of the subject disclosure use a mass-storage device (such as a magnetic or optical disk and its corresponding disk drive) as the permanent storage device 1402.

Other implementations use a removable storage device (such as a floppy disk, flash drive, and its corresponding disk drive) as the permanent storage device 1402. Like the permanent storage device 1402, the system memory 1404 is a read-and-write memory device. However, unlike the permanent storage device 1402, the system memory 1404 is a volatile read-and-write memory, such as random access memory. System memory 1404 stores any of the instructions and data that the one or more processing unit(s) 1412 needs at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input device interface 1414 and the output device interface 1406. The input device interface 1414 enables a user to communicate information and select commands to the electronic system. Input devices used with the input device interface 1414 include, for example, alphanumeric keyboards and pointing devices (also called "cursor control devices"). The output device interface 1406 enables, for example, the display of images generated by the electronic system 1400. Output devices used with the output device interface 1406 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks (not shown) through one or more network interfaces 1416. In this manner, the computer can be a part of one or more network of computers (such as a local area network ("LAN"), a wide area network ("WAN"), or an Intranet, or a network of networks, such as the Internet. Any or all components of the electronic system 1400 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs).

In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
adjusting a value of at least one of a plurality of control parameters of a combined projection format based at least in part on a comparison of a compression efficiency of the combined projection format to a memory bandwidth consumption of the combined projection format, wherein a first control parameter of the plurality of control parameters controls a resampling resolution in a first direction and a second control parameter of the plurality of control parameters controls a resampling resolution in a second direction;
adjusting the memory bandwidth consumption of the combined projection format using the adjusted value of the at least one of the plurality of control parameters; and encoding a video stream with the combined projection format using the plurality of control parameters.

2. The method of claim 1, wherein characteristics of a first projection format are integrated with characteristics of a second projection format using the plurality of control parameters, and wherein each of the plurality of control parameters has a value in a range of 0 to 1.

3. The method of claim 1, wherein the value of at least one of the plurality of control parameters is adjusted using predefined functions or predefined look-up tables addressed by latitude.

4. The method of claim 1, further comprising:
adjusting the compression efficiency of the combined projection format using the adjusted value of the at least one of the plurality of control parameters.

5. The method of claim 2, wherein the first control parameter controls column resampling resolution with respect to latitude, and wherein the second control parameter controls line resampling resolution with respect to the latitude.

6. The method of claim 5, wherein the combined projection format represents an equirectangular projection format when the first control parameter and the second control parameter are each set to 0.

7. The method of claim 5, wherein the combined projection format represents an equal area projection format when the first control parameter is set to zero and the second control parameter is set to 1.

8. The method of claim 1, further comprising:
adjusting the value of at least one of the plurality of control parameters of the combined projection format for a segment of the video stream, the adjusted at least one of the plurality of control parameters corresponding to a compression efficiency of the combined projection format that exceeds a predetermined efficiency threshold; and
stitching the segment of the video stream into the combined projection format with the adjusted at least one of the plurality of control parameters.

9. The method of claim 1, further comprising:
determining whether a reference sample in an area of an image of the video stream is an active sample or a non-active sample during rendering of the video stream; and
applying a guard band to the area of the image when the reference sample was determined as a non-active sample.

10. A system comprising:
a video capture device configured to capture a 360 degree video;
a stitching device configured to stitch the captured 360 degree video into a combined projection format, wherein a plurality of control parameters of the combined projection format are adjusted based on a projection format decision, wherein a first control parameter of the plurality of control parameters controls a resampling resolution in a first direction and a second control parameter of the plurality of control parameters controls a resampling resolution in a second direction, and wherein the combined projection format represents an equirectangular projection format when the first control parameter and the second control parameter are each set to a first value and represents an equal area projection format when the first control parameter is set to a first value and the second control parameter is set to a second value different from the first value; and an encoding device configured to:
encode the stitched 360 degree video into a 360 degree video bitstream, the 360 degree video bitstream including signaling that indicates the combined projection format; and
prepare the 360 degree video bitstream for transmission to a rendering device.

11. The system of claim 10, wherein the projection format decision is based on raw data statistics associated with the 360 degree video and coding statistics from the encoding device.

12. The system of claim 10, further comprising:
a decoding device configured to receive the 360 degree video bitstream as input and decode projection format information from the signaling in the 360 degree video bitstream, the projection format information indicating the combined projection format.

13. The system of claim 12, wherein the rendering device is configured to receive the 360 degree video bitstream from the decoding device as input and render view sequences from the 360 degree video bitstream with the combined projection format.

14. The system of claim 10, wherein the rendering device is configured to convert the 360 degree video bitstream in the combined projection format to a different projection format prior to rendering and display of the 360 degree video bitstream.

15. A method comprising:
adjusting a value of at least one of a plurality of control parameters of a combined projection format that integrates an equirectangular projection format and an equal area projection format, wherein a first control parameter of the plurality of control parameters controls a resampling resolution in a first direction and a second control parameter of the plurality of control parameters controls a resampling resolution in a second direction;
modifying a viewport quality of a video stream using the adjusted value of the at least one of the plurality of control parameters; and
stitching the video stream into the combined projection format using the plurality of control parameters.

16. The method of claim 15, wherein the first control parameter controls column resampling resolution with respect to latitude, and wherein the second control parameter controls line resampling resolution with respect to the latitude.

17. The method of claim 16, wherein adjusting the value of at least one of the plurality of control parameters further comprises:
adjusting the value of the first control parameter; and
modifying the column resampling resolution of the video stream based on the adjusted value of the first control parameter,
wherein the viewport quality of the video stream is modified with the modified column resampling resolution while the value of the second control parameter remains unchanged.

18. The method of claim 16, wherein adjusting the value of at least one of the plurality of control parameters comprises:
adjusting the value of the second control parameter; and
modifying the line resampling resolution around a pole of the video stream based on the adjusted value of the second control parameter, wherein the viewport quality of the video stream is modified with the modified line resampling resolution while the value of the first control parameter remains unchanged.

19. A system comprising:
a video capture device configured to capture a 360 degree video; and
a stitching device configured to stitch the captured 360 degree video into a combined projection format that integrates at least two different projection formats, wherein a plurality of control parameters of the combined projection format are adjusted to modify a viewport quality of the 360 degree video, wherein a first control parameter of the plurality of control parameters controls a resampling resolution in a first direction and a second control parameter of the plurality of control parameters controls a resampling resolution in a second direction.

20. The system of claim 19, wherein the first control parameter controls column resampling resolution with respect to latitude, and wherein the second control parameter controls line resampling resolution with respect to the latitude.

21. The system of claim 20, wherein the value of the first control parameter is modified to modify the column resampling resolution of the 360 degree video based on the adjusted value of the first control parameter, and
wherein the viewport quality of the 360 degree video is modified with the modified column resampling resolution while the value of the second control parameter remains unchanged.

22. The system of claim 20, wherein the value of the second control parameter is adjusted to modify the line resampling resolution around a pole of the 360 degree video based on the adjusted value of the second control parameter, and
wherein the viewport quality of the 360 degree video is modified with the modified line resampling resolution while the value of the first control parameter remains unchanged.

23. The system of claim 19, further comprising:
an encoding device configured to:
encode the stitched 360 degree video into a 360 degree video bitstream, the 360 degree video bitstream including signaling that indicates the combined projection format; and
prepare the 360 degree video bitstream for transmission to a rendering device.

* * * * *